(12) United States Patent
Viswanath et al.

(10) Patent No.: US 11,710,089 B2
(45) Date of Patent: Jul. 25, 2023

(54) METHOD AND APPARATUS FOR A BENCHMARKING SERVICE

(71) Applicant: ATLASSIAN PTY LTD, Sydney (AU)

(72) Inventors: Sri Viswanath, Palo Alto, CA (US); Stephen Deasy, Mountain View, CA (US); Gene Drabkin, Los Gatos, CA (US); Marc Andrew Reisen, San Francisco, CA (US); Orpheus Mall, San Francisco, CA (US); Jon Hartlaub, Mountain View, CA (US)

(73) Assignee: ATLASSIAN PTY LTD., Sydney (AU)

( * ) Notice: Subject to any disclaimer, the term of this patent is extended or adjusted under 35 U.S.C. 154(b) by 768 days.

(21) Appl. No.: 15/633,568

(22) Filed: Jun. 26, 2017

(65) Prior Publication Data
US 2018/0181898 A1 Jun. 28, 2018

Related U.S. Application Data

(60) Provisional application No. 62/438,095, filed on Dec. 22, 2016.

(51) Int. Cl.
*G06Q 10/0639* (2023.01)
*G06Q 10/101* (2023.01)
(Continued)

(52) U.S. Cl.
CPC ......... *G06Q 10/06393* (2013.01); *G06N 5/04* (2013.01); *G06N 20/00* (2019.01); *G06Q 10/101* (2013.01)

(58) Field of Classification Search
CPC ........ G06Q 10/00; G06Q 30/02; G06Q 10/06; G06Q 10/101; G06Q 10/06393; G06N 5/04; G06N 20/00
(Continued)

(56) References Cited

U.S. PATENT DOCUMENTS 8,019,638 B1 * 9/2011 Uhl ........................ G06Q 10/06
705/7.31
8,626,698 B1 * 1/2014 Nikolaev ......... G06Q 10/06393
705/7.17
(Continued)

OTHER PUBLICATIONS

Yamashita, Experiences from Performing Software Quality Evaluations via Combining Benchmark-Based Metrics Analysis, Software Visualization, and Expert Assessment, Dec. 11, 2015, 2015 IEEE International Conference on Software Maintenance and Evolution, pp. 421-428 (Year: 2015).*

*Primary Examiner* — Robert D Rines
(74) *Attorney, Agent, or Firm* — Brownstein Hyatt Farber Schreck, LLP

(57) ABSTRACT

Methods, apparatuses, and computer program products are described herein that are configured to be embodied as a benchmarking service. In an example, an apparatus is configured to access input data, wherein the input data is representative of a current project; parse the input data to generate one or more input project units; extract one or more features from the one or more input project units, wherein the features are representative of at least one of project statistics, project bugs, project releases, project documentations, and organization data; receive a benchmarking model, wherein the benchmarking model was derived using a historical data set; and generate an output based on the benchmarking model and the one or more features, wherein the output is configured to provide an evaluation of the current project in the form at least one of a score and one or more recommendations.

15 Claims, 9 Drawing Sheets

(51) Int. Cl.
*G06N 20/00* (2019.01)
*G06N 5/04* (2023.01)

(58) Field of Classification Search
USPC ............................................... 705/7.11–7.42
See application file for complete search history.

(56) References Cited

U.S. PATENT DOCUMENTS

| | | | |
|---|---|---|---|
| 2007/0271128 A1* | 11/2007 | Terrence Bolling ... | G06Q 10/00 705/7.15 |
| 2008/0015910 A1* | 1/2008 | Reisz ................... | G06Q 10/063 705/7.11 |
| 2008/0313595 A1* | 12/2008 | Boulineau .......... | G06Q 30/0201 717/101 |
| 2013/0218626 A1* | 8/2013 | Duquette ............... | G06Q 10/06 705/7.23 |
| 2013/0339254 A1* | 12/2013 | Figlin ................... | G06Q 10/06 705/301 |
| 2014/0053127 A1* | 2/2014 | Madison ................ | G06F 8/30 717/103 |
| 2014/0278771 A1* | 9/2014 | Rehman ............ | G06F 16/24578 705/7.31 |
| 2015/0112766 A1* | 4/2015 | Barney .............. | G06Q 30/0203 705/7.32 |
| 2016/0140474 A1* | 5/2016 | Vekker ............. | G06Q 10/06393 705/7.39 |
| 2017/0364850 A1* | 12/2017 | Johnston .......... | G06Q 10/06313 |
| 2018/0137445 A1* | 5/2018 | Tijerina ................. | G06N 20/00 |

* cited by examiner

500

802 — Apply a project evaluation function to the one or more features to identify a set of scores 804 — Generate a confidence interval for each score of the set of scores 806 — Determine the score for the one or more features based on the confidence interval

902 — Apply a project evaluation function to the one or more features to identify a set of one or more recommendations 904 — Generate a confidence interval for each recommendation of the set of one or more recommendations 906 — Determine the one or more recommendations for the one or more features based on the confidence interval

FIG. 9

METHOD AND APPARATUS FOR A BENCHMARKING SERVICE

CROSS-REFERENCE TO RELATED APPLICATIONS

The present application claims the benefit of U.S. Provisional Patent Application Ser. No. 62/438,095, which was filed on Dec. 22, 2016 and titled METHOD AND APPARATUS FOR A BENCHMARKING SERVICE, the entire contents of which are incorporated by reference herein for all purposes.

TECHNOLOGICAL FIELD

Embodiments of the present invention relate generally to data analytics technologies and, more particularly, relate to a method, apparatus, and computer program product for a benchmarking service.

BACKGROUND

Currently, systems and methods for project management and collaboration provide tools for users and groups of users to plan, collaborate, and track projects at a variety of different levels. However, such systems do not efficiently provide metrics, statistics and/or recommendations regarding the project. Through applied effort, ingenuity, and innovation, solutions to improve such methods have been realized and are described in connection with embodiments of the present invention.

BRIEF SUMMARY

In some example embodiments, a method for evaluating a project and providing a benchmarking service is provided. The method of this embodiment may include accessing input data, wherein the input data is representative of a current project. The method of this embodiment may also include parsing the input data to generate one or more input project units. The method of this embodiment may also include extracting one or more features from the one or more input project units, wherein the features are representative of at least one of project statistics, project bugs, project releases, project documentations, and organization data. The method of this embodiment may also include receiving a benchmarking model, wherein the benchmarking model was derived using a historical data set. The method of this embodiment may also include generating an output based on the benchmarking model and the one or more features, wherein the output is configured to provide an evaluation of the current project in the form at least one of a score and one or more recommendations.

In further example embodiments, an apparatus for evaluating a project and providing a benchmarking service is provided that includes a processing system arranged to cause the apparatus to at least access input data from a project management and collaboration tool, wherein the input data is representative of a current project. The processing system may also be arranged to cause the apparatus to parse, using an input data analysis and normalization module, the input data to generate one or more input project units. The processing system may also be arranged to cause the apparatus to extract one or more features from the one or more input project units, wherein the features are representative of at least one of project statistics, project bugs, project releases, project documentations, and organization data. The processing system may also be arranged to cause the apparatus to receive a benchmarking model, wherein the benchmarking model was derived using a historical data set. The processing system may also be arranged to cause the apparatus to generate an output based on the benchmarking model and the one or more features, wherein the output is configured to provide an evaluation of the current project in the form at least one of a score and one or more recommendations.

In yet further example embodiments, a computer program product may be provided for evaluating a project and providing a benchmarking service that includes at least one non-transitory computer-readable storage medium having computer-readable program instructions stored therein with the computer-readable program instructions including program instructions configured to access input data from a project management and collaboration tool, wherein the input data is representative of a current project. The computer-readable program instructions may also include program instructions configured to parse, using an input data analysis and normalization module, the input data to generate one or more input project units. The computer-readable program instructions may also include program instructions configured to extract one or more features from the one or more input project units, wherein the features are representative of at least one of project statistics, project bugs, project releases, project documentations, and organization data. The computer-readable program instructions may also include program instructions configured to receive a benchmarking model, wherein the benchmarking model was derived using a historical data set. The computer-readable program instructions may also include program instructions configured to generate an output based on the benchmarking model and the one or more features, wherein the output is configured to provide an evaluation of the current project in the form at least one of a score and one or more recommendations In yet further example embodiments, an apparatus for evaluating a project and providing a benchmarking service is provided that includes means for accessing input data, wherein the input data is representative of a current project. The apparatus of this embodiment may also include means for parsing the input data to generate one or more input project units. The apparatus of this embodiment may also include means for extracting one or more features from the one or more input project units, wherein the features are representative of at least one of project statistics, project bugs, project releases, project documentations, and organization data. The apparatus of this embodiment may also include means for receiving a benchmarking model, wherein the benchmarking model was derived using a historical data set. The apparatus of this embodiment may also include means for generating an output based on the benchmarking model and the one or more features, wherein the output is configured to provide an evaluation of the current project in the form at least one of a score and one or more recommendations.

BRIEF DESCRIPTION OF THE DRAWINGS

Figure 1:
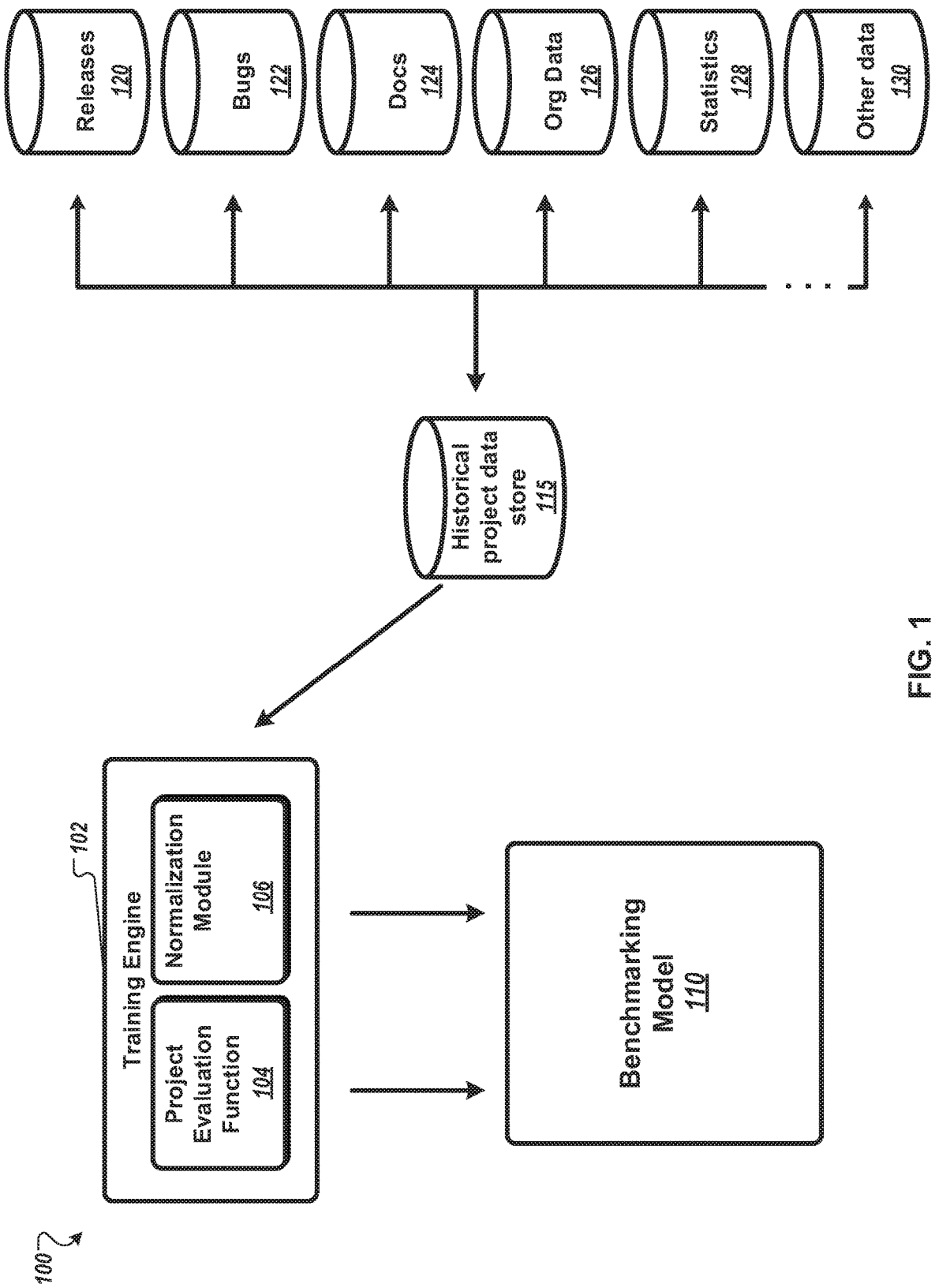
Figure 2:
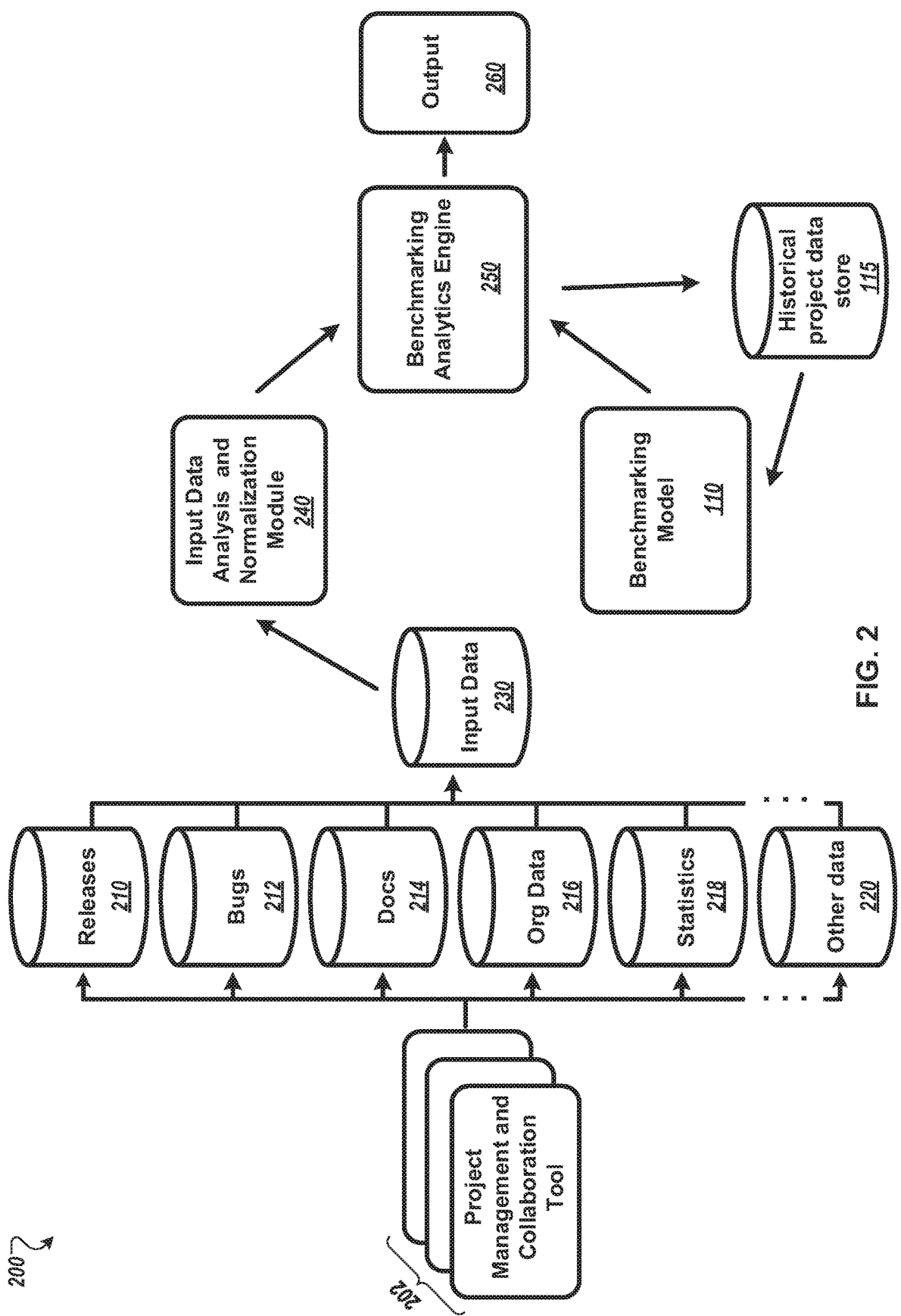
Figure 3:
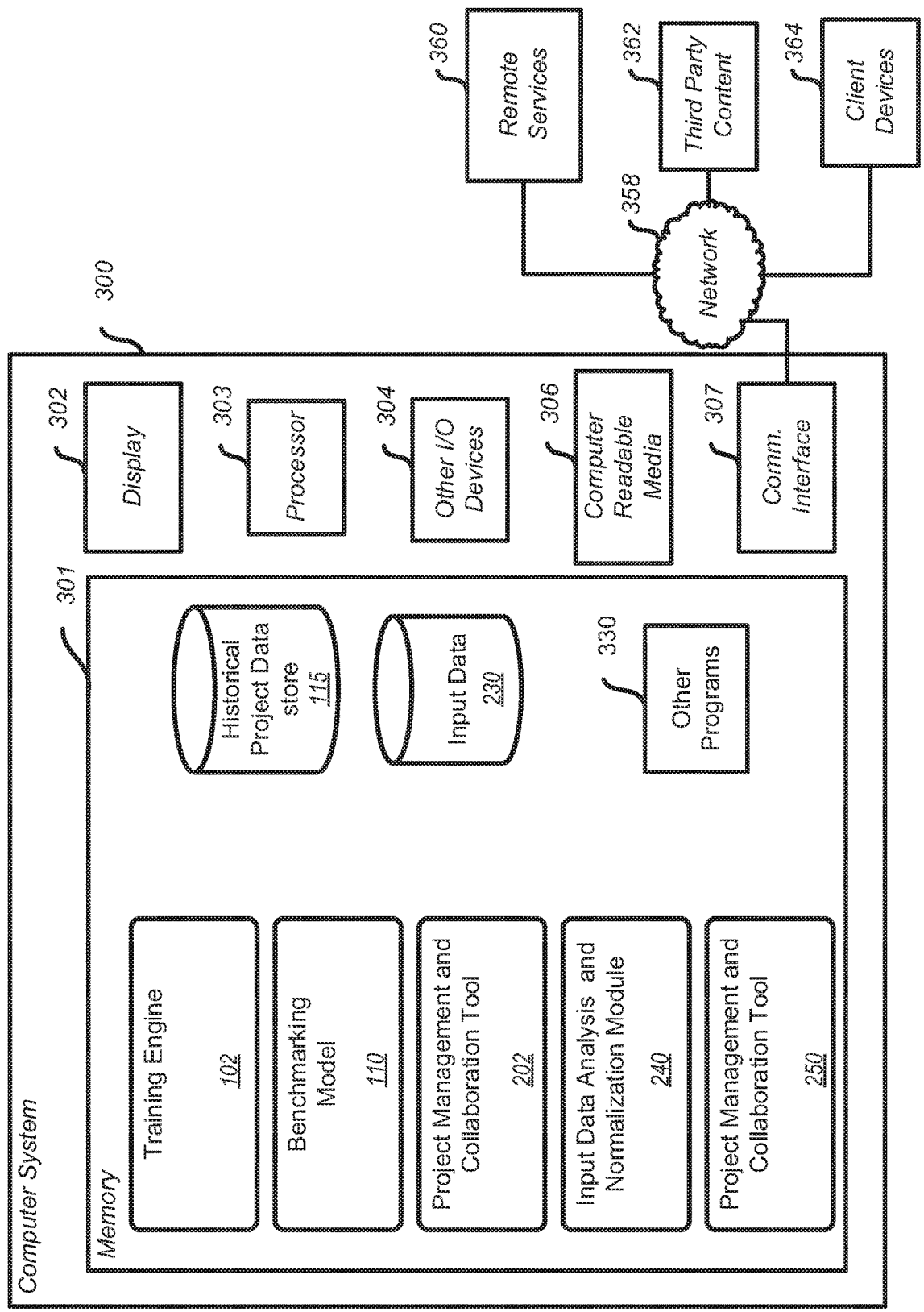
Figure 4:
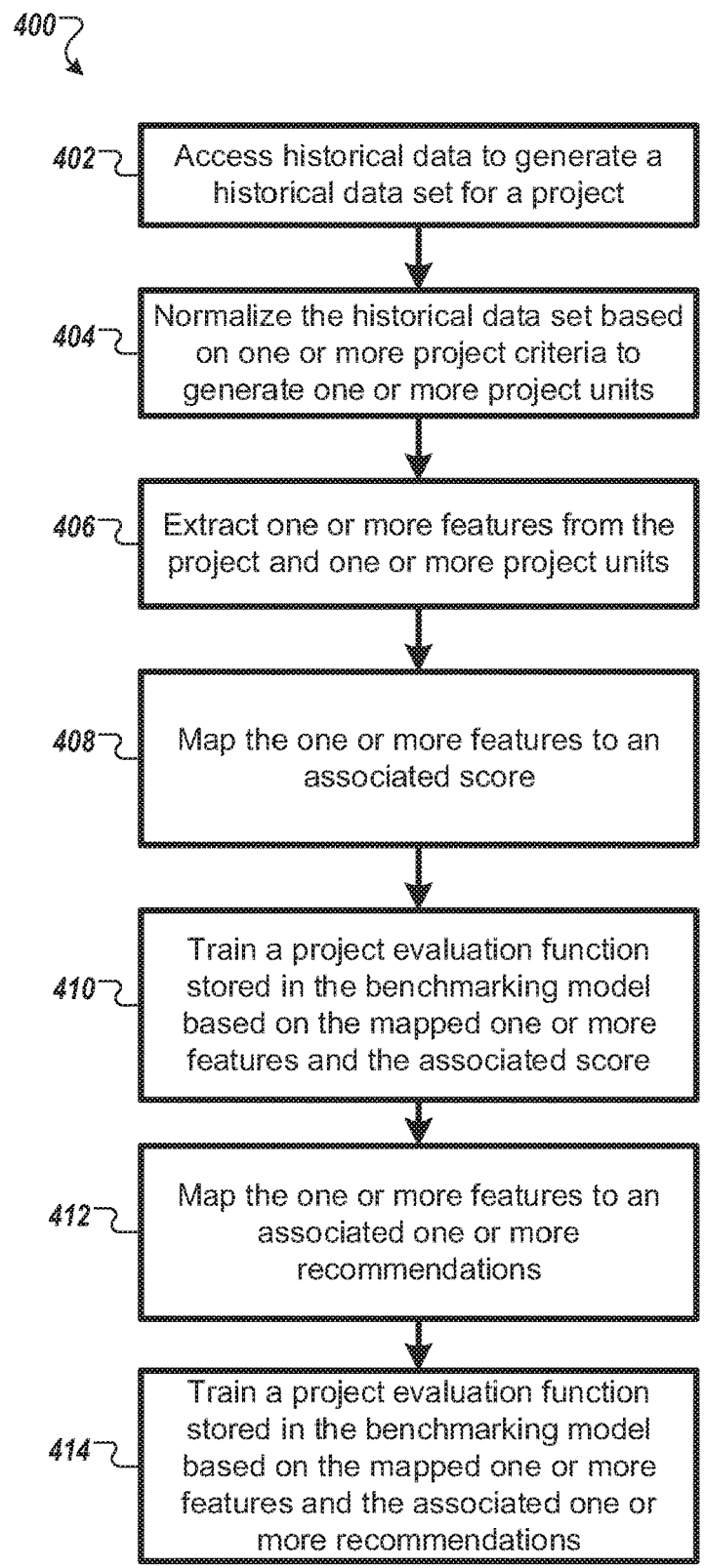
Figure 5:
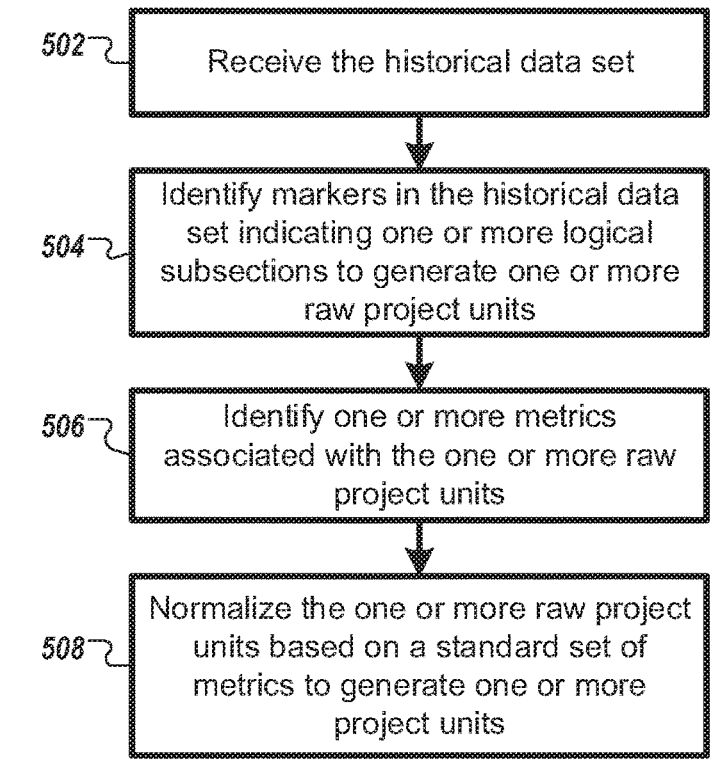
Figure 6:
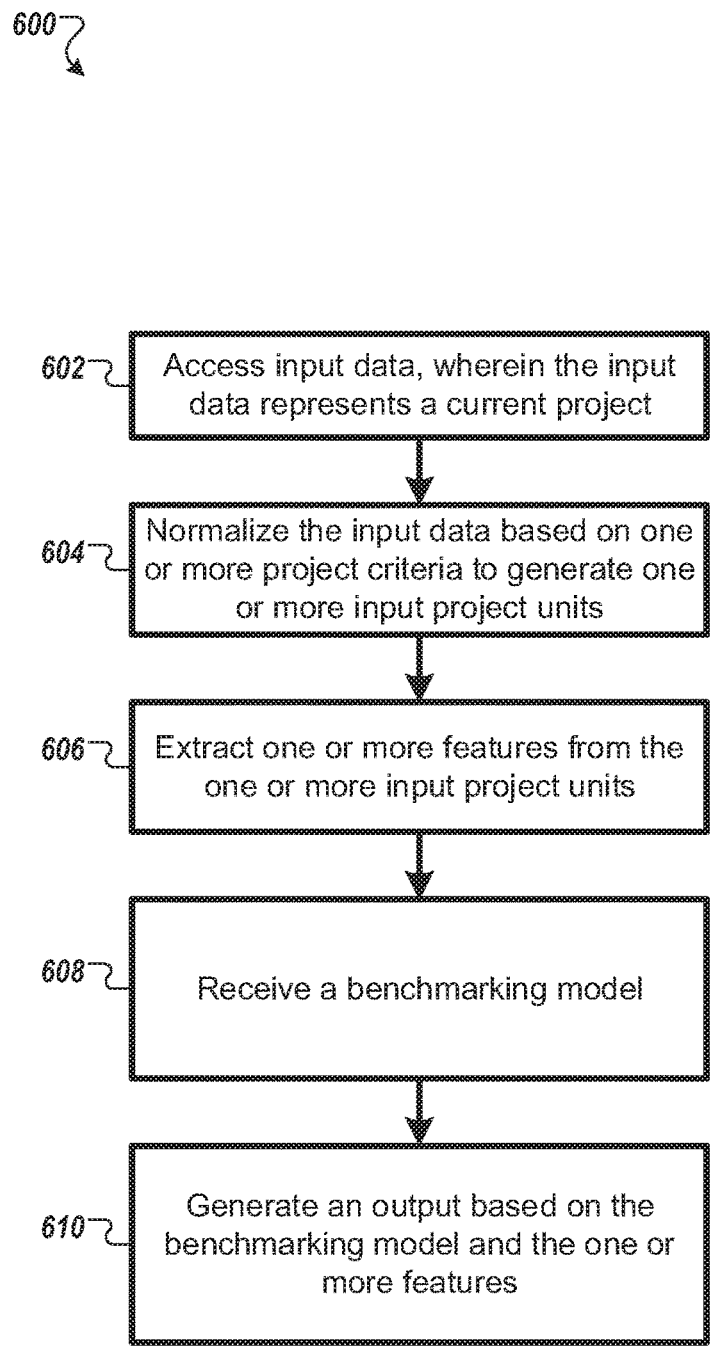
Figure 7:
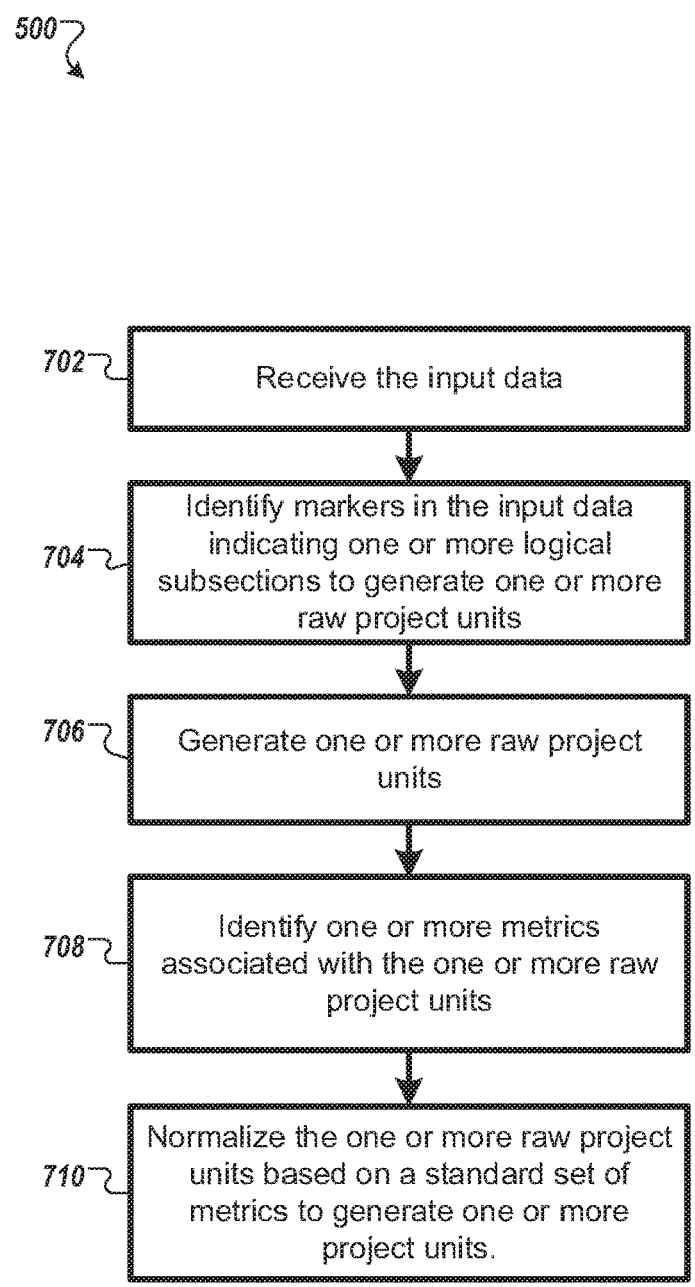

Having thus described embodiments of the invention in general terms, reference will now be made to the accompanying drawings, which are not necessarily drawn to scale, and wherein:

FIG. 1 is an example block diagram of example components of an example benchmarking model training environment;

FIG. 2 is an example block diagram of example components of an example benchmarking service environment;

FIG. 3 is an example block diagram of an example computing device for practicing embodiments of the benchmarking model training environment and the example benchmarking service environment;

FIG. 4 is a flowchart illustrating an example method for training a benchmarking model;

FIG. 5 is a flowchart illustrating an example method for normalizing historical project data;

FIG. 6 is a flowchart illustrating an example method for generating an output based on data representing a current project;

FIG. 7 is a flowchart illustrating an example method for normalizing input data;

FIG. 8 is a flowchart illustrating an example method for determining a score for one or more features; and FIG. 9 is a flowchart illustrating an example method for determining one or more recommendations for one or more features.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Systems and methods described herein are configured to transform or otherwise manipulate a general purpose computer so that it functions as a special purpose computer to provide a benchmarking service, such as by providing scoring, data analytics and benchmarking for a current project. In an example embodiment, the systems and methods described herein are configured to provide analytics that are suggestive of a score and/or one or more recommendations relating to project management, project analysis, project collaboration, and/or the like.

In some examples, the score may be based on the ability of the team to achieve what they set out to achieve. That is, at the beginning of the project the team may set certain initial metrics, such as timing, resources, and quality, and then at the completion of the project, may compare the final metrics to the initial metrics. Advantageously, the better a team is at projecting metrics at the start, the better it is for the company as it is in some examples, more predictable, more readily replicated, and provides improved resource planning. In some examples, the higher the score the higher the performance of the team. Such a score can then be used, in some examples, to determine whether to select a team to perform a specific project.

In some examples, the systems and methods described herein may ingest or otherwise access input data that represents a project (e.g., an individual or collaborative enterprise that is carefully planned and designed to achieve a particular aim), one or more projects, and/or a portion of a project. In some examples, the systems and methods are configured to evaluate the project and/or provide analysis/recommendations for the project in the form of a score or one or more recommendations. In some examples, the systems and methods are configured to provide a pre-mortem (e.g., reviewing the details of why a product or project launch will fail before the product actually launches). Accordingly, the provision of a score, recommendations, and/or the like before and/or during a project are advantageous, in some examples, to correct project planning, staffing, execution or the like to advantageously improve the project before it starts or while it is in process.

Alternatively or additionally, a benchmark score (hereinafter benchmark score or simply a score) and/or one or more recommendations may be advantageous, in some examples, for the purpose of benchmarking (e.g., a standard or point of reference against which things may be compared or assessed). That is, in some examples, the score and/or one or more recommendations may be used as a comparison between two teams within a company, two companies, and/or the like.

Specifically, and in some examples, the systems and methods disclosed herein are configured to provide a benchmarking service. In some examples, the benchmarking service is built or otherwise instantiated using a computational learning model that is trained using historical project data from a series of historical projects. In particular, the computational learning model (e.g., a benchmarking model) is configured to identify one or more extracted features that are suggestive a particular result, such as a score or a recommendation. Given a trained computation learning model, the system is configured to ingest or otherwise access input data related to a current project. Given said input data, the example systems and methods are configured to output a score, a recommendation, a benchmark score, or the like.

In some embodiments, the systems and methods described herein may be specifically used to benchmark projects related to computer software development. For example, given a project to build a software module that comprises data representative of a project overview, project timeline, project documentation, source code, bug tracking, and the like, the systems and methods disclosed herein are configured to assign the project score. In some examples, the score may be indicative of an efficiency, a likelihood of project completion within a time period, a project cost, a project velocity, other similar metrics, and/or a combination of the foregoing. Alternatively or additionally, in some examples, the systems and methods are configured to output one or more recommendations. In some examples, the recommendations make take the form of recommendations to improve the score such as more communication, additional testing, more frequent collaboration, etc.

Advantageously, the score and/or the recommendations are normalized so as to provide a project, team or company score. Accordingly, in some examples, the system is able to compare score across teams, projects, companies, industries and/or the like.

Alternatively or additionally, the systems and methods described herein may further be configured to alter or otherwise modify a project plan. For example, the systems and methods may in some examples modify a timeline, staffing mix, and/or the like to automatically improve the score or the recommendations. Whereby in other examples, the system and method is configured to output a score and/or one or more recommendations that a user or group of users may implement manually.

FIG. 1 is an example block diagram of example components of an example benchmarking model training environment 100 that is used to train the benchmarking model that is relied upon by the benchmarking service and/or benchmarking service environment. In some example embodiments, the benchmarking model training environment 100 comprises a training engine 102, benchmarking model 110, and a historical project data store 115. The training engine 102 and the benchmarking model 110 may take the form of, for example, a code module, a component, circuitry and/or the like. The components of the benchmarking model training environment 100 are configured to provide various logic (e.g. code, instructions, functions, routines and/or the like) and/or services related to the benchmarking model training environment 100.

In some examples, the historical project data store 115 comprises a variety of input data representative of historical projects. In some examples, the historical data may be obtained and/or stored during the development of a project. In yet other cases, the historical data may be obtained and/or otherwise stored at the conclusion of the project. Irrespective, the historical project data is configured to provide an indication of the project plan (e.g., the intent or workflow that the project was supposed to follow) and an indication of how the project actually went and/or was completed. That is, whether the project achieved certain or otherwise desirable metrics, such as one or more of the metrics/statistics defined herein.

Alternatively or additionally, the historical data may be labeled and/or characterized by a score or an evaluation (e.g., in some examples the evaluation may take the form of a recommendation). The label or characterization is intended to provide a user's or group of users (e.g., a project team, a crowd source, etc.) evaluation of a particular project when compared to the corpus of additional historical projects stored in the historical project data store. For example, a project may receive an average score if it was generally on time but had an above average number of bugs, where a project that was completed early with a minimal number of bugs may be assigned an above average or high score.

In an instance in which a score is used or is otherwise provided, the score may represent a value out of a total (e.g., 55 out of a 100) that indicates project efficiency, project reliability and/or the like. In an instance in which an evaluation is provided, the evaluation may include text that describes what could and/or should have been have been done better. For example, a team with a low score may indicate that more communication, more discrete tasks, clear leadership, and/or the like may have improved the project overall.

In some examples, these labels may be provided by a user or a group of users interacting with a health monitor (not shown). In some examples, a health monitor may determine whether a project has a full-time owner, the project team is balanced, the team has a shared understanding, the project's value and metrics are clear, the project has an end-to-end demo, the project has a "readme," the project's dependencies are clear, the project has velocity, and/or the like. The system may ingest or otherwise access said health monitor data and use it as part of the historical data stored in historical project data store 115. Additional historical data may also be analyzed in some examples.

In some examples, the historical project data store 115 may also comprises a variety of additional historical project data representative of historical projects. For example, the historical project data store 115 may comprise data related to releases 120, bugs 122, documentations ("docs") 124, organization data 126, statistics 128, and/or other data 130. Alternatively or additionally, the historical data store 115 may comprise data that is suggestive of a project, discrete steps within the project, a timeline, a journey, a workflow, efficiency metrics, and/or the like.

In an example embodiment, releases 120 comprises data that is representative of a code release or software release. In some examples, releases are used to track what software was deployed to an environment. In some examples, a release is a snapshot of any number of artifacts that will be used in the deployment process and their associated metadata, such as issues, code changes and any test metadata that might be relevant to what is being deployed. In one example, a release is created from the result of a single build, multiple builds, and/or the like. When a release is analyzed, the system can determine project units, code changes, issues and other metadata that was used when making the artifact for that build. This information, in some examples, can be used for purposes such as release notes, quality control and infrastructure planning, and further allows the system to compare any two releases to see the changes between them. That is, this data may be used, such as by training engine 102, when determining features that are suggestive of a score and/or one or more recommendations/evaluations.

In an example embodiment, bugs 122 comprises data that is representative of one or more bugs, errors, faults, incorrect results, unexpected results or the like that were detected during the development of a code, during a software build, during a software release, and/or the like. In some examples, a project may include a list of identified bugs. In addition, bug data may comprise relevant details to include descriptions, severity level, screenshots, version and/or the like relating to said bugs. In some examples, bug data may also include data related to prioritization and urgency that are indicative of the severity and/or importance of a particular bug. Alternatively or additionally, the data may also include bugs reported after release of the project. Accordingly, training engine 102 may rely on bugs 122 when training benchmarking model 110.

In an example embodiment, docs 124 comprises documentation related to a code or software release. In some examples, the documentation may relate to internal/external documentation generated during the development of a code, during a software build, during a software release, and/or the like. The documentation may also include internal project pages, status pages, internal discussions, internal tickets, and/or the like. Accordingly, training engine 102 may rely on docs 124 when training benchmarking model 110.

In an example embodiment, organization data 126 comprises data indicative of an organization, such as an organizational chart, background on personal, development strategy (e.g., agile, lean, etc.), and/or the like. In some examples, this data is indicative of the number of team members, the backgrounds of the team members, the team leader, and/or the like. In other examples, other data such as organization, location, company profile, and/or the like can be included. Accordingly, training engine 102 may rely on organizational data 126 when training benchmarking model 110. For example, organizational data 126 may be used to determine the size and experience of a team that is working on a project.

In an example embodiment, statistics 128 comprises statistical or metrics based data related to a code or software release. In some examples, statistics data may be indicative of metrics such as lines of code, hours worked, number of people working on the team, experience level of the team, business value, sum of story points, total time remaining on a sprint, and/or the like. Alternatively or additionally, statistics data may be representative of a real-time or near real-time calculation of the project's velocity (ratio of time spent versus point resolved) and/or project quality (bug fix time versus points solved). Accordingly, training engine 102 may rely on statistics 128 when labeling the data in historical project data store 115 and/or when training benchmarking model 110.

In an example embodiment, other data 130 comprises data that is representative of a code or software release. Other data may also be included in some examples that relate to the project that are outside of the project software. For example, other data 130 may be obtained from other systems such as mail programs, calendars, chat tools, databases, slide presentations and/or the like. In other examples, external commentary may be accessed, such as product reviews, comments, likes, etc. In such examples, other data 130 may inform or otherwise be used to label historical project data (e.g., classify or otherwise score a project based on reviews either internally or externally) and/or may be usable when training benchmarking model 110.

In some examples, the training engine 102 is configured to access or otherwise ingest historical data or historical project data from historical project data store 115 to train the benchmarking model 110 via supervised or unsupervised computational learning. Additional information regarding the functionality of training engine 102, to include steps related to training benchmarking model 110, is described with respect to at least FIG. 4.

In some examples, the training engine 102 comprises a normalization module 104. The normalization module 104, in some examples, may be configured to normalize the historical data into project units (e.g., a release, an issue, a logical subsection, a work flow, a portion of a workflow, a bug, a work unit defined by number of hours worked, number of lines of code, outputs, calendar days, and/or the like, and/or the like) so as to enable data to be compared across projects and entities (e.g., so as to provide benchmarking services). In some examples, the normalization module 104 is configured to parse the data into project units, and then normalize each projects distinct project units using derived metrics (e.g., metrics that were captured during the creation of the one or project units) and standard metrics (e.g., metrics determined to be standard in the industry). That is, in some examples, each project may be broken down into project units based on number of hours worked, number of lines of code, outputs, calendar days, and/or the like. In other examples, each defined project unit, such as based on logical subsections, may be compared to standard metrics to determine a scaling factor or other adjustment for each of the determined metrics (e.g., if a logical subsection has 5 hours, the metrics related to that subsection or project unit will be weighted 0.05 of the standard 100 hour subsection or project unit).

Alternatively or additionally, the normalization module 106 may be usable with respect to processing historical project data in the historical project data store 115, such as to normalize the historical project data before the historical project data is scored or otherwise labeled. Additional details with regard to normalization module 106 are described with respect to at least FIG. 5.

For example, projects can be segregated into project units and/or subsections based on identified markers. In some examples, these markers may be based on markers such as project components or sub-sections, versions or milestones, issues, sub-tasks, and/or the like. In other examples, the markers may indicate a completed sprint, module, storyboard or the like. Alternatively or additionally, the subsections may be defined based on preferences of an industry, company, team, and/or the like.

In one example, related to bug fixing, a project management and collaboration tool may include internal tracking metrics related to the type of bug, the quantity of bugs, and the time it takes to fix the bugs. These metrics may, in some examples, be used to normalize a project. Other factors based on a code analysis, an expected investment in time, an initial project plan, and/or the like may also be used to normalize a project.

Once the projects are segregated into subsections, the subtasks may be assigned or otherwise labeled with metrics, such as based on the metrics and/or statistics data that is stored with respect to metrics or statistics 128. For example, for a particular subsection or project unit, the system may label said subsection or project unit according to a project velocity, hours spent, a number of lines of code and/or the like. In some examples, the systems and methods may then compare these metrics to a standard metric, such as a standard project velocity, hours spent, and number of lines of code for a project unit. Based on this comparison, the systems and methods may derive the size of the particular subsection or project unit compared to the standard project unit. For example, the project unit may be classified as 1.4 standard project units based on a larger number of lines of code when compared to an average project unit.

In some examples, the benchmarking model 110 generally provides a trained model that, when given a set of input features, is configured to provide an output of a score, a recommendation or the like. In some embodiments, the benchmarking model 110 can be generated, such as by the training engine 102, using supervised learning or unsupervised learning. In some examples, such learning can occur offline, in a system startup phases, or may occur in real-time or near real-time during project execution. The benchmarking model 110 comprises the results of the project evaluation function 104 (e.g., clustering algorithms, classifiers, neural networks, ensemble of trees) in that the benchmarking model 110 is configured or otherwise trained to map an input value or input features to one of a set of predefined output scores or recommendations, and modify or adapt the mapping in response to historical data in the historical project data store 115. As noted herein, the historical project data store 115 contains examples of inputs and/or features and their respective associated scores and/or recommendations.

That is, historical project data store 115 may include data that is representative of features, such as number of bugs, project velocity, number of releases and/or the like. In some embodiments, the project evaluation function maps the labeled data representing historical projects, such as project statistics, project bugs, project releases, project documentations, and organization data, to one or more scores or recommendations. Alternatively or additionally, the benchmarking model 110 may be trained so as to score or otherwise label the historical project data in historical project store 115. For example, based on the data and the labels, the benchmarking model 110 may be trained so as to generate a score or additional label for the one or more project units.

Alternatively or additionally, the project evaluation function 104 may be configured as a classifier that models a particular outcome, such that the classifier returns a decision as to which group or score the input data most likely belongs. In such a case, the historical data is used to model inputs and likely outputs. Each training example is a data instance that represents input to the model and a label representing the model output. Referring to the exemplary classification task, each training example in the training data set used to modify the project evaluation function may represent an input to the classifier that is labeled with the correct judgment to be made by the classifier (e.g., a label representing the group to which the input data instance belongs). That is, a set of features representing a project and a project score.

Alternatively or additionally, benchmarking model 110 may be trained to extract one or more features from the historical data using pattern recognition, based on unsupervised learning, supervised learning, semi-supervised learning, reinforcement learning, association rules learning, Bayesian learning, solving for probabilistic graphical models, among other computational intelligence algorithms that may use an interactive process to extract patterns from data.

In some examples, the historical data may comprise data that has been generated using user input, crowd based input, and/or the like. In other examples, the historical input data may not be labeled, and may, in some examples, be labeled by the training engine 102. Whereas in other examples, the historical data may comprise one or more features. In such examples, the data is analyzed using unsupervised learning whereby features are clustered into homogenous groups.

FIG. 2 is an example block diagram of example components of an example benchmarking service environment 200. In some example embodiments, the benchmarking service environment 200 comprises a project management and collaboration tool 202, input data 230, an input data analysis and normalization module 240, a benchmarking analytics engine 250, output module 260, the historical project data store 115 and/or the benchmarking model 110. The project management and collaboration tool 202, the input data analysis and normalization module 240, the benchmarking analytics engine 250, and/or the output module 260 may take the form of, for example, a code module, a component, circuitry and/or the like. The components of the benchmarking service environment 200 are configured to provide various logic (e.g. code, instructions, functions, routines and/or the like) and/or services related to the benchmarking service environment.

In some examples and in order to provide the benchmarking service for a current project, such as a project that has an end state for releasing a software build, data is generated, accessed, and/or otherwise ingested from a project management and collaboration tool 202. Project management and collaboration tool 202, in some examples, is a software program that is desired to and/or otherwise enables a user to plan, track, manage, and/or otherwise interact with a current project (e.g., Atlassian JIRA®). In some instances, the project management and collaboration tool 202 provides a user with a workflow management system that the user may use for a plurality of matters, including, but not limited to, running projects, tracking assets, and/or the like that tracks actions by one or more users moving through a workflow. In some examples, the project management and collaboration tool 202 is configured to rely on concepts of project units, issues, projects, and/or workflows.

In some examples, issues may take the form of project units in the project management and collaboration tool 202. Each project unit can be further defined by assigning the project unit a project unit type. For example, if is user is running a project in an office, project units could represent particular subtasks that the user needs to satisfy before a project is considered to be complete. Each project unit type may, in some examples, be a type of task, like administration task, filing task, or create document task. If, in an example, the user is using project management and collaboration tool 202 for asset tracking, a project unit could represent an asset (or inventory item) and the project unit type could be the types of assets (laptops, monitors, printers etc.). Alternatively or additionally, if the user is using project management and collaboration tool 202 for software development, each project unit may take the form of a module that accomplishes a defined subtask or logical subsection of a code release. Project units then progress (or move) though a project management and collaboration tool 202 via an associated workflow that dictates what can and can't happen to that project unit.

In some examples, projects are a mechanism to group project units, and apply a set of defaults. These defaults make sure project units have the information needed to be progressed and tracked through a workflow. Workflow dictates how a project unit can be progressed in a project. In some examples, workflows are often modeled on existing processes, and are made up of statuses (or steps) and transitions (movements between statuses). When a project unit is created, it may be assigned a workflow and a status on that workflow. Where a project unit can move to is defined by the transitions that exit that status.

In some examples, the project management and collaboration tool 202 may also store or otherwise have access to data related to releases 210, bugs 212, documentations 214, organization data 216, statistics 218, and/or other data 220. The releases 210, bugs 212, documentations 214, organization data 216, statistics 218, and/or other data 220 make up at least a portion of input data 230. In some examples, releases 210, bugs 212, documentations 214, organization data 216, statistics 218, and/or other data 220 may be similar to and/or contain the same data as releases 120, bugs 122, documentations ("docs") 124, organization data 126, statistics 128, and/or other data 130.

In an example embodiment, releases 210 comprises data that is representative of a code release or software release. In some examples, releases are used to track what software was deployed to an environment(s). In essence, a release is a snapshot of any number of artifacts that will be used in the deployment process and their associated metadata, such as project units, code changes and any test metadata that might be relevant to what is being deployed. In one example, a release is created from the result of a single build. When a release is analyzed, the system can determine code changes, issues and other metadata that were used when making the artifact for that build. This information, in some examples, can be used for purposes such as release notes, quality control and infrastructure planning, and allows a user to compare any two releases to see the changes between them.

In an example embodiment, bugs 212 comprises data that is representative of one or more bugs, errors, faults, incorrect results, unexpected results or the like that was detected during the development of a code or software release. In some examples, a project may include a list of identified bugs and/or a list of bugs for each project unit. In addition, the data may comprise relevant details to include descriptions, severity level, screenshots, version and/or the like. In some examples, the data may also include data related to prioritization and urgency that are indicative of the severity and importance of a particular bug. Alternatively or additionally, the data may also include bugs reported after release of the project.

In an example embodiment, docs 214 comprises documentation related to a code or software release. In some examples, the documentation may relate to internal or external documentation describing the project, the workflow, the release or the like. The documentation may also include internal project pages, status pages, internal discussions, internal tickets, and/or the like.

In an example embodiment, organization data 216 comprises data indicative of an organization, such as an organizational chart, background on personal, development strategy (e.g., agile, lean, etc.), and/or the like. In some examples, this data is indicative of the number of team members, the back grounds of the team members, the team leader, and/or the like. In other examples, other data such as organization, location, company profile, and/or the like can be included.

In an example embodiment, statistics 218 comprises statistical or metrics based data related to a code or software release. In some examples, the data may be indicative of metrics such as lines of code, hours worked, number of people working, business value, sum of story points, total time remaining on a sprint, and/or the like. Alternatively or additionally, the data may include a real-time or near real-time calculation of the project's velocity (ratio of time spent versus point resolved) and project quality (bug fix time versus points solved).

In an example embodiment, other data 220 comprises data that is representative of a code or software release. Other data may also be included in some examples that relate to the project that are outside of the project software. For example, data may be obtained from other systems such as mail programs, calendars, chat tools, databases, slide presentations and/or the like. In other examples, external commentary may be accessed, such as product reviews, comments, likes, etc.

In some examples, the input data analysis and normalization module 240 is configured to access or otherwise ingest the input data, such as raw input data 230. The input data 230 may represent, in some examples, a current project, a project plan, and/or the like. In some examples, the input data analysis and normalization module 240 may act to access or otherwise ingest input data in real-time, in near real-time, or at predetermined project intervals (e.g., at the conclusion of module, subtask, subsection or the like). Accordingly, in some examples, and in conjunction with the benchmarking analytics engine 250, a benchmark, such as a score and/or one or more recommendations, may be generated for the current project.

For example, one form of input may take the form of data representative of a release from release 210. The release may be divided into one or more raw project units based on logical subsections as defined by project management and collaboration tool 202, such as issues. Once segregated into the raw project units, the input data analysis and normalization module 240 is configured to assign one or more metrics, such as the number of bugs, such as from bugs 212; statistics or metrics, from statistics 218; and/or the like. In some examples, the input data analysis and normalization module 240 may use organization data, such as org data 216, to determine the number and/or type of people that work on each of the raw project units. In further examples, the input data analysis and normalization module 240 may analyze documentation, such as from docs 214, to determine a user evaluation of a particular raw project unit.

In some examples, the input data analysis and normalization module 240 is configured to normalize the raw input data to generate one or more project units and/or otherwise parse the project into the one or more project units. In some examples, the input data analysis and normalization module 240 may be configured to normalize the raw input data, such that the data can be analyzed by the benchmarking analytics engine 250. In some examples the input data analysis and normalization module 240 is configured to parse the data into project units and then normalize the project units using derived metrics and standard metrics.

For example, projects can be segregated into project units based on identified subsections or markers. In some examples, these markers may be based on markers such as project components or sub-sections, versions or milestones, issues, and/or sub-tasks. In other examples, the markers may indicate a completed sprint, module, storyboard or the like. In further examples, the markers may take the form of a metric, such as hours worked, lines of code, number of bugs, and/or the like. Alternatively or additionally, the subsections may be defined based on preferences of an industry, company, team, and/or the like.

Once the projects are segregated into the one or more subtasks or raw project units, the input data analysis and normalization module 240 may label the raw project units with the one or more metrics, such as project velocity, hours spent, and number of lines of code. In some examples, the input data analysis and normalization module 240 may then compare these metrics to a standard metric, such as a standard project velocity, hours spent, and number of lines of code for a project unit. Based on this comparison, the input data analysis and normalization module 240 may derive the size of the particular subsection or project unit to the standard project unit. A subtask or raw project unit that is normalized is output to the benchmarking analytics engine 250 as a project unit.

Alternatively or additionally, the input data analysis and normalization module 240 is configured to extract one or more features from the project units. In some examples, feature extraction may comprise extracting or otherwise identify the normalized metrics, such as project velocity, hours spent, and number of lines of code for a project unit. In some examples, the feature extraction and labeling may be performed by benchmarking model 110, such as in an example whereby the benchmarking model 110 has been trained to identify relevant features and to further provide a label to said relevant features.

In some examples, the benchmarking analytics engine 250 is configured to access or otherwise ingest the one or more project units, the extracted features, and/or the like from the input data analysis and normalization module 240. Additionally or alternatively, the benchmarking analytics engine 250 is configured to access or otherwise ingest the trained benchmarking model 110.

In some examples, the benchmarking analytics engine 250 is configured to apply a trained project evaluation function to the one or more accessed features to identify a set of scores. For example, if the input feature was project velocity, the benchmarking analytics engine 250 may apply the project velocity to the trained project evaluation function to determine whether the project is progressing at fast, slow, or medium pace compared to other projects. In some examples, the project evaluation function would output a suggested score based on other projects that had the same project velocity. Alternatively or additionally, the benchmarking analytics engine 250 may generate one or more recommendations to increase or maximize the analyzed features, such as project velocity. Additional details with regard to the benchmarking analytics engine 250 are recited with respect to FIGS. 8 and 9.

In some examples, the benchmarking analytics engine 250 may be configured to classify a project unit and its label or metrics. In such examples, the benchmarking analytics engine 250 is configured to analyze the project unit and its label, such that it classifies the project unit, with a particular confidence interval, for a most likely score. Similarly, benchmarking analytics engine 250 is configured to classify the project unit to determine one or more most likely recommendations. Alternatively or additionally, the presence or absence of a feature in a project unit may assist benchmarking analytics engine 250 in classifying the project unit.

The benchmarking analytics engine 250 is configured, in some examples, to generate an output. In some examples, the output may take the form of the score or the set of recommendations. The output, in some examples, may be out via a user interface, may be displayed within the project as metric, may be transmitted electronically to project leadership, and/or the like. In some examples, the output may be updated in real-time, near real-time, at designated project intervals, and/or the like.

Alternatively or additionally, the benchmarking analytics engine 250 may be configured to alter a current project in the project management and collaboration tool 202 based on the score and/or the recommendations. For example, the benchmarking analytics engine 250 may, in some examples, implement the one or more recommendations. In other examples, the benchmarking analytics engine 250 may make changes to the project to improve the health of the project, such as by setting a project leader, adjusting workflow to improve project velocity and/or the like. In some examples, the recommendation may include the need to add more people or, if not, a suggestion to increase the time it will take to complete the project.

In some examples, a user, group of users, and/or the like may evaluate output 260. In such cases the evaluation along with the input data are stored in the historical project data store to further train and refine benchmarking model 110, such as is described with respect to FIG. 1.

FIG. 3 is an example block diagram of an example computing device for practicing embodiments of a data analytics and benchmarking service. In particular, FIG. 3 shows a computing system 300 that may be utilized to implement a benchmarking model training environment 100 that comprises a training engine 102, benchmarking model 110, and a historical project data store 115, and the benchmarking analytics environment 200 that comprises a project management and collaboration tool 202, input data 230, an input data analysis and normalization module 240, a benchmarking analytics engine 250, output module 260, the historical project data store 115 and/or the benchmarking model 110.

One or more general purpose or special purpose computing systems/devices may be used to implement the training engine 102, benchmarking model 110, collaboration tool 202, input data analysis and normalization module 240, benchmarking analytics engine 250, and output module 260. In addition, the computing system 300 may comprise one or more distinct computing systems/devices and may span distributed locations. In some example embodiments, the training engine 102, benchmarking model 110, collaboration tool 202, input data analysis and normalization module 240, benchmarking analytics engine 250, and/or output module 260 may be configured to operate remotely via the network 450. In other example embodiments, a pre-processing module or other module that requires heavy computational load may be configured to perform that computational load and thus may be on a remote device, cloud server, or server. For example, any of training engine 102, benchmarking model 110, collaboration tool 202, input data analysis and normalization module 240, benchmarking analytics engine 250, and/or output module 260 may be accessed remotely. Furthermore, each block shown may represent one or more such blocks as appropriate to a specific example embodiment. In some cases one or more of the blocks may be combined with other blocks. Also, the training engine 102, benchmarking model 110, collaboration tool 202, input data analysis and normalization module 240, benchmarking analytics engine 250, and/or output module 260 may be implemented in software, hardware, firmware, or in some combination to achieve the capabilities described herein.

In the example embodiment shown, computing system 300 comprises a computer memory ("memory") 301, a display 302, one or more processors 303, input/output devices 304 (e.g., keyboard, mouse, display, touch screen, audio or video output device, gesture sensing device, virtual reality, augmented reality, wearables and/or the like), other computer-readable media 305, and communications interface 306. The processor 303 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 3 as a single processor, in some example embodiments the processor 303 comprises a plurality of processors. The plurality of processors may be in operative communication with each other and may be collectively configured to perform one or more functionalities of the system as described herein.

The training engine 102, benchmarking model 110, collaboration tool 202, input data analysis and normalization module 240, benchmarking analytics engine 250, and output module 260 are shown residing in memory 301. The memory 301 may comprise, for example, transitory and/or non-transitory memory, such as volatile memory, non-volatile memory, or some combination thereof. Although illustrated in FIG. 3 as a single memory, the memory 301 may comprise a plurality of memories. The plurality of memories may be embodied on a single computing device or may be distributed across a plurality of computing devices collectively configured to function as the disclosed system. In various example embodiments, the memory 401 may comprise, for example, a hard disk, random access memory, a USB drive, cloud storage, cache memory, flash memory, a compact disc read only memory (CD-ROM), digital versatile disc read only memory (DVD-ROM), an optical disc, circuitry configured to store information, or some combination thereof.

In some examples, computer system 300 may take the form of a cloud service, whereby the training engine 102, benchmarking model 110, collaboration tool 202, input data analysis and normalization module 240, benchmarking analytics engine 250, and output module 260 can be activated or otherwise launch on demand and scaled as needed. Accordingly, in such examples, the recited training engine 102, benchmarking model 110, collaboration tool 202, input data analysis and normalization module 240, benchmarking analytics engine 250, and output module 260 may be implemented via the cloud, as software as a service, and/or the like.

In other embodiments, some portion of the contents, some or all of the components of training engine 102, benchmarking model 110, collaboration tool 202, input data analysis and normalization module 240, benchmarking analytics engine 250, and output module 260 may be stored on and/or transmitted over the other computer-readable media 405. The components of the training engine 102, benchmarking model 110, collaboration tool 202, input data analysis and normalization module 240, benchmarking analytics engine 250, and output module 260 preferably execute on one or more processors 303 and are configured to enable operation of a system, as described herein.

Alternatively or additionally, other code or programs 330 (e.g., an interface for administration, related collaboration projects, a Web server, a Cloud server, a distributed environment, and/or the like) and potentially other data repositories, such as other data sources 340, also reside in the memory 301, and preferably execute on one or more processors 303. Of note, one or more of the components in FIG. 3 may not be present in any specific implementation. For example, some embodiments may not provide other computer readable media 305 or a display 302.

The training engine 102, benchmarking model 110, collaboration tool 202, input data analysis and normalization module 240, benchmarking analytics engine 250, and output module 260 are further configured to provide functions such as those described with reference to FIGS. 1 and 2. The training engine 102, benchmarking model 110, collaboration tool 202, input data analysis and normalization module 240, benchmarking analytics engine 250, and output module 260 may interact with the network 358, via the communications interface 307, with remote services 360 (e.g. project data, metrics, and/or the like), third-party content providers 362 and/or client devices 364. The network 358 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 358 may take the form of the internet or may be embodied by a cellular network such as an LTE based network. In this regard, the communications interface 358 may be capable of operating with one or more air interface standards, communication protocols, modulation types, access types, and/or the like. The client devices 364 include desktop computing systems, notebook computers, mobile phones, smart phones, personal digital assistants, tablets, wearables, and/or the like.

In an example embodiment, components/modules of the training engine 102, benchmarking model 110, collaboration tool 202, input data analysis and normalization module 240, benchmarking analytics engine 250, and output module 260 are implemented using standard programming techniques. For example, the training engine 102, benchmarking model 110, collaboration tool 202, input data analysis and normalization module 240, benchmarking analytics engine 250, and output module 260 may be implemented as a "native" executable running on the processor 303, along with one or more static or dynamic libraries. In other embodiments, the training engine 102, benchmarking model 110, collaboration tool 202, input data analysis and normalization module 240, benchmarking analytics engine 250, and output module 260 may be implemented as instructions processed by a virtual or other remote operation machine that executes as one of the other programs 330. In general, a range of programming languages known in the art may be employed for implementing such example embodiments, including representative implementations of various programming language paradigms, including but not limited to, object-oriented (e.g., Delphi, Java, C++, C#, Visual Basic.NET, Smalltalk, and the like), functional (e.g., Clojure, ML, Wolfram, Lisp, Scheme, and the like), procedural (e.g., C, Go, Fortran, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the training engine 102, benchmarking model 110, collaboration tool 202, input data analysis and normalization module 240, benchmarking analytics engine 250, and output module 260, such as by using one or more application programming interfaces can be made available by mechanisms such as through application programming interfaces (API); libraries for accessing files, databases, or other data repositories; through scripting languages such as XML; or through Web servers, FTP servers, or other types of servers providing access to stored data. The historical project data store 115 and input data 230 may be implemented as one or more database systems, file systems, or any other technique for storing such information, or any combination of the above, including implementations using distributed computing techniques. Alternatively or additionally, the historical project data store 115 and input data 230 may be local data stores but may also be configured to access data from the remote services 360.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the training engine 102, benchmarking model 110, collaboration tool 202, input data analysis and normalization module 240, benchmarking analytics engine 250, and output module 260 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIGS. 4 through 9 illustrate example flowcharts of the operations performed by an apparatus, such as computing system 300 of FIG. 3, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 301 of an apparatus employing an embodiment of the present invention and executed by a processor 303 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4 through 9, when executed, convert a computer or processing circuitry into a particular machine configured to perform an example embodiment of the present invention. Accordingly, the operations of FIGS. 4 through 9 define an algorithm for configuring a computer or processor, to perform an example embodiment. In some cases, a general purpose computer may be provided with an instance of the processor which performs the algorithm of FIGS. 4 through 9 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

FIG. 4 is a flowchart illustrating an example method for training a benchmarking model. In block 402, training engine 102 and/or benchmarking model 110 are configured to access historical data to generate a historical data set for a project. In some examples, the project or historical project may take the form of a project that is defined by a project management and collaboration tool 202, such as Atlassian JIRA®. In other examples, the current project may take the form of any entity that has a defined start and end state. For example, the project may be a code release, construction project, a publication, and/or the like.

In block 404, training engine 102 and/or benchmarking model 110 are configured to normalize the historical data set based on one or more project criteria to generate one or more project units. Normalization is described in further detail with respect to FIG. 5. In block 406, training engine 102 and/or benchmarking model 110 are configured to extract one or more features from the project and one or more project units. In some examples, the features may be one or more statistics or metrics that are determined to be suggestive of a particular result. These may include features described herein, such has hours work, project velocity, number of lines of code, and/or the like.

In block 408, training engine 102 and/or benchmarking model 110 are configured to map the one or more features to an associated score. In some examples, the training engine 102 and/or benchmarking model 110 is configured to receive user input, crowd source input or the like to attach a score to the one or more features. In some examples, this input represents a user's evaluation of the one or more features. Alternatively or additionally, the system may classify, using clustering a function or the like, the input features and determine a score or a suggested score. In an instance in which a suggested score is provided, the suggested score may be verified and/or otherwise confirmed by a user, a crowd source, or the like.

In block 410, training engine 102 and/or benchmarking model 110 are configured to train a project evaluation function stored in the benchmarking model based on the mapped one or more features and the associated score. As described above, the benchmarking model, such as benchmarking model 110, may be trained based on the input features and scores, such that similar input features will be suggestive of a same or similar score. In some cases, the learning and/or training may be accomplished based on supervised or unsupervised computation learning.

In block 412, training engine 102 and/or benchmarking model 110 are configured to map the one or more features to an associated one or more recommendations. In some examples, the training engine 102 and/or benchmarking model 110 is configured to receive user input, crowd source input or the like to attach a recommendation to the one or more features. In some examples, this input represents a user's evaluation of the one or more features. Alternatively or additionally, the system may classify, using clustering a function or the like the input features and determine a recommendation or a suggested recommendation. In an instance in which a suggested recommendation is provided, the suggested recommendation may be verified and/or otherwise confirmed by a user, a crowd source, or the like.

In block 414, training engine 102 and/or benchmarking model 110 are configured to train a project evaluation function stored in the benchmarking model based on the mapped one or more features and the associated one or more recommendations. As described above, the benchmarking model may be trained based on the input features and recommendation, such that similar input features will be suggestive of a same or similar recommendation. In some cases, the learning and/or training may be accomplished based on supervised or unsupervised computation learning.

FIG. 5 is a flowchart illustrating an example method for normalizing historical project data. In block 502, training engine 102 is configured to receive the historical data set. In some examples, the input data is representative of a historical project, and contains a plurality of logical subsections, such as issues, subtasks, modules, and/or the like.

In block 504, training engine 102 is configured to identify markers in the historical data set indicating one or more logical subsections to generate one or more raw project units. In some examples, a historical project may include one or more markers that are indicative of logical subsections within said historical project. For example, these logical subsections may be defined based on a project unit, an issue, a bug, a task, or the like. These subsections may be defined in the software tool, such as by project management and collaboration tool 202.

In block 506, training engine 102 is configured to identify one or more metrics associated with the one or more raw project units. Based on the labeled data, one or more metrics may be extracted by the training engine 102. For example, the training engine 102 may extract the total hours worked, the project velocity, the number of bugs etc.

In block 508, training engine 102 is configured to normalize the one or more raw project units based on a standard set of metrics to generate one or more project units. In some examples, the training engine 102 may define a predetermine project unit size. For example, in some embodiments, the project units may defined based on a total number of hours. Accordingly, in some examples, each of the raw project units may be modified based on the standard scale or metric. For example, the one or more raw project units may be converted to project units based on a standard metric of fifty hours of total project time.

FIG. 6 is a flowchart illustrating an example method for generating an output based on data representing a current project. In block 602, input data analysis and normalization module 240 and/or benchmarking analytics module 250 are configured to access input data, wherein the input data represents a current project. In some examples, the current project may take the form of a project that is defined by a project management and collaboration tool 202, such as Atlassian JIRA®. In other examples, the current project may take the form of any entity that has a defined start and end state. For example, the project may be a code release, construction project, a publication, and/or the like.

In block 604, input data analysis and normalization module 240 and/or benchmarking analytics module 250 are configured to normalize the input data based on one or more project criteria to generate one or more input project units. Normalization is described in further detail with respect to FIG. 7.

In block 606, input data analysis and normalization module 240 and/or benchmarking analytics module 250 are configured to extract one or more features from the one or more input project units. In some examples, the features may be one or more statistics or metrics that are determined to be suggestive of a particular result. These may include features such has hours work, project velocity, number of lines of code, and/or the like.

In block 608, input data analysis and normalization module 240 and/or benchmarking analytics module 250 are configured to receive a benchmarking model. In some examples, the benchmarking model may be access or otherwise received over a local network, remote network, and/or the like. In some examples, the benchmarking model is a model that includes a project evaluation function that is trained based on historical data.

In block 610, input data analysis and normalization module 240 and/or benchmarking analytics module 250 are configured generate an output based on the benchmarking model and the one or more features. In some examples, the features are mapped to results, such as a score or recommendation, using the project evaluation function and the benchmarking model. Based on the mapped result, an output is generated. Generating an output is further described with respect to FIGS. 8 and 9.

FIG. 7 is a flowchart illustrating an example method for normalizing input data. In block 702, input data analysis and normalization module 240 is configured to receive the input data. In some examples, the input data is representative of a current project, and contains a plurality of logical subsections, such as issues, subtasks, modules, and/or the like.

In block 704, input data analysis and normalization module 240 is configured to identify markers in the input data indicating one or more logical subsections to generate one or more raw project units. In some examples, a project may include one or more markers that are indicative of logical subsections within a project. For example, these logical subsections may be defined based on an issue, a bug, a task, or the like. These subsections may be defined in the software tool, such as by project management and collaboration tool 202.

In block 706, input data analysis and normalization module 240 is configured to generate one or more raw project units. Based on the identified markers, the input data analysis and normalization module 240 is configured to generate or otherwise parse the input data into one or more project units that are labeled with the input data that corresponds thereto. For example, and as described herein, each raw project unit could be defined or otherwise labeled with a number of bugs, statistics or metrics, such as project velocity, a health, related documentation, organizational data or the like.

In block 708, input data analysis and normalization module 240 is configured to identify one or more metrics associated with one or more raw project units. Based on the labeled data, one or more metrics may be extracted by input data analysis and normalization module 240. For example, the input data analysis and normalization module 240 may extract the total hours worked, the project velocity, the number of bugs etc.

In block 710, input data analysis and normalization module 240 is configured to normalize the one or more raw project units based on a standard set of metrics to generate one or more project units. In some examples, the input data analysis and normalization module 240 may define a predetermine project unit size. For example, in some embodiments, the project units may defined based on a total number of hours. Accordingly, in some examples, each of the raw project units may be modified based on the standard scale or metric. For example, the one or more raw project units may be converted to project units based on a standard metric of fifty hours of total project time.

FIG. 8 is a flowchart illustrating an example method for determining a score for one or more features. In block 802, benchmarking analytics module 250 is configured to apply a project evaluation function to the one or more features to identify a set of scores. In some examples, the project evaluation function is mapped to scores based on the one or features. In some examples, the one or more features, such as project velocity, may result in the project evaluation function suggesting pre-stored and trained scores, such as a score out of 5, 100, and/or the like, that is suggestive of at least one of a project efficiency, project likelihood of success, likelihood of timely completion, and/or the like.

In block 804, benchmarking analytics module 250 is configured to generate a confidence interval for each score of the set of scores. In the application of the project evaluation function, the benchmarking analytics module 250 may map the features to a plurality of scores. Accordingly, the benchmarking analytics module 250 is configured to generate a confidence interval that is suggestive of the most likely score.

In block 806, benchmarking analytics module 250 is configured to determine the score for the one or more features based on the confidence interval. In some examples, the benchmarking analytics module 250 may select the top score. In other examples, the benchmarking analytics module 250 may select each of the scores that satisfy a given confidence interval, and output said median, mean, or other statistical adaptation of the scores.

FIG. 9 is a flowchart illustrating an example method for determining one or more recommendations for one or more features. In block 902, benchmarking analytics module 250 is configured to apply a project evaluation function to the one or more features to identify a set of one or more recommendations. In some examples, the project evaluation function is mapped to one or more recommendations based on the one or features. In some examples, the one or more features, such as project velocity, may result in the project evaluation function suggesting pre-stored and trained recommendations, such as additional people are needed, a more clear team leader is desired, and/or the like.

In block 904, benchmarking analytics module 250 is configured to generate a confidence interval to each recommendation of the set of one or more recommendations. In the application of the project evaluation function, the benchmarking analytics module 250 may map the features to a plurality of recommendations. Accordingly, the benchmarking analytics module 250 is configured to generate a confidence interval that is suggestive of the most likely results.

In block 906, benchmarking analytics module 250 is configured to determine the one or more recommendations for the one or more features based on the confidence interval. In some examples, the benchmarking analytics module 250 may select the top recommendations, such as the top 3, based on the confidence interval. In other examples, the benchmarking analytics module 250 may select each of the recommendations that satisfy a given confidence interval, and output said recommendations in order of highest confidence interval to lowest confidence interval.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer system for project evaluation based on a benchmarking service, the computer system comprising at least a processor and a memory having computer coded instructions therein, the processor configured to execute the computer coded instructions to:

retrieve a set of data objects corresponding to a set of issues that are processed by a software development platform in accordance with a programmed workflow, the set of data objects comprising one or more data objects created in response to input received from a set of client devices executing the programmed workflow for a current project;

access a set of historical data objects to generate a historical data set for the current project;

normalize the historical data set based on a standard set of metrics to generate one or more project units;

normalize the set of data objects by matching the one or more data objects associated with the current project to the one or more project units from the historical data set;

extract one or more features from the normalized set of data objects, the one or more features comprising a metric associated with one or more of a software release, software bug, or a software issue associated with a software development project;

in response to extracting the one or more features, generate a set of weighted project units by normalizing the one or more extracted features using a set of metric values;

transmit the set of weighted project units to a benchmarking model including a project evaluation function, the benchmarking model trained using a historical data set of data objects generated during previous software development projects and managed by the software development platform, the historical data set of data objects having been normalized using the set of metric values;

receive an output from the project evaluation function of the benchmarking model, the output comprising an ordered list of proposed changes to the programmed workflow on a user interface;

in response to an input to the user interface, cause at least the processor to modify the programmed workflow performed by the software development platform in accordance with a proposed change indicated by the input; and in response to the input, cause at least the processor to implement a training engine to train the benchmarking model using the transmitted set of weighted project units and the proposed change.

2. The computer system of claim 1, wherein the processor is further configured to execute the computer coded instructions to:
identify markers in the set of data objects to generate a set of raw project units;
identify the set of metric values from the set of raw project units; and
generate the set of weighted project units from the set of metric values.

3. The computer system of claim 2, wherein the markers are at least one of a condition, a validator, or a post function.

4. The computer system of claim 1, wherein the processor is further configured to execute the computer coded instructions to:
access historical data to generate a historical data set for a set of historical projects;
extract a set of historical features from the set of historical projects;
map the set of historical features to an associated score; and
train the project evaluation function from the mapped set of historical features and the associated score.

5. The computer system of claim 4, wherein the processor is further configured to execute the computer coded instructions to:
identify markers in the historical data set, the markers identifying one or more subsections;
generate a set of raw project units based on the identified markers;
identify a set of historical metrics associated with the set of raw project units; and
normalize the set of raw project units based on the set of historical metrics to generate the set of weighted project units.

6. The computer system of claim 4, wherein the processor is further configured to execute the computer coded instructions to:
map the set of historical features to an associated set of recommendations; and
train the project evaluation function based on the mapped set of historical features and the associated set of recommendations.

7. The computer system of claim 1, wherein the set of data objects is accessed in real time, near real time or at a predetermined project interval.

8. A method for evaluating a project and providing a benchmarking service, the method including steps executed by one or more computer processors, the one or more computer processors configured to implement machine readable computer instructions, the method comprising:
retrieving a set of data objects corresponding to a set of issues that are processed by a software development platform in accordance with a programmed workflow, the set of data objects comprising one or more data objects created in response to input received from a set of client devices executing the programmed workflow for a current project;
accessing a set of historical data objects to generate a historical data set for the current project;
normalizing the historical data set based on a standard set of metrics to generate one or more project units;
normalizing the set of data objects by matching the one or more data objects associated with the current project to the one or more project units from the historical data set;
extracting one or more features from the normalized set of data objects, the one or more features comprising a metric associated with one or more of a software release, software bug, and a software issue associated with a software development project;
in response to extracting the one or more features, generating a set of weighted project units by normalizing the one or more extracted features using a set of metric values;
transmitting the set of weighted project units to a benchmarking model including a project evaluation function, the benchmarking model trained using a historical data set of data objects generated during previous software development projects and managed by the software development platform, the historical data set of data objects having been normalized using the set of metric values;
receiving an output from the project evaluation function of the benchmarking model, the output comprising an ordered list of proposed changes to the programmed workflow on a user interface;
in response to an input to the user interface, causing the one or more computer processors to modify the programmed workflow performed by the software development platform in accordance with a proposed change indicated by the input; and
in response to the input, causing the one or more computer processors to implement a training engine to train the benchmarking model using the transmitted set of weighted project units and the proposed change.

9. The method of claim 8, further comprising:
identifying markers in the set of data objects;
generating a set of raw project units based on the identified markers;
identifying the set of metric values associated with the set of raw project units; and
normalizing the set of weighted project units based on the set of metric values.

10. The method of claim 9, wherein the markers are at least one of a condition, a validator, or a post function.

11. The method of claim 8, further comprising:
accessing historical data to generate a historical data set for a set of historical projects;
extracting a set of historical features from the set of historical projects;
mapping the set of historical features to an associated score; and
training the project evaluation function from the mapped set of historical features and the associated score.

12. The method of claim 11, further comprising:
identifying markers in the historical data set;
generating a set of raw project units based on the identified markers;
identifying a set of historical metrics associated with the set of raw project units; and
normalizing the set of raw project units based on the set of historical metrics to generate a normalized set of raw project units.

13. The method of claim 11, further comprising:
mapping the set of historical features to an associated set of recommendations; and
training the project evaluation function based on the mapped set of historical features and the associated set of recommendations.

14. The method of claim 8, wherein the set of data objects is accessed in real time, near real time or at a predetermined project interval.

15. A non-transitory computer readable storage medium, the non-transitory computer readable storage medium comprising instructions, that, when executed by one or more computer processors, configure the one or more computer processors to:
- retrieve a set of data objects corresponding to a set of issues that are processed by a software development platform in accordance with a programmed workflow, the set of data objects comprising one or more data objects created in response to input received from a set of client devices executing the programmed workflow for a current project;
- access a set of historical data objects to generate a historical data set for the current project;
- normalize the historical data set based on a standard set of metrics to generate one or more project units;
- normalize the set of data objects by matching the one or more data objects associated with the current project to the one or more project units from the historical data set;
- extract one or more features from the normalized set of data objects, the one or more features comprising a metric associated with one or more of a software release, software bug, or a software issue associated with a software development project;
- in response to extracting the one or more features, generate a set of weighted project units by normalizing the one or more extracted features using a set of metric values;
- transmit the set of weighted project units to a benchmarking model, the benchmarking model trained using a historical data set of data objects generated during previous software development projects and tracked by the software development platform, the historical data set of data objects having been normalized using the set of metric values;
- receive an output from the benchmarking model, the output comprising an ordered list of proposed changes to the programmed workflow on a user interface;
- in response to an input to the user interface, cause the one or more computer processors to modify the programmed workflow performed by the software development platform in accordance with a proposed change indicated by the input; and
- in response to the input, cause the one or more computer processors to implement a training engine to train the benchmarking model using the transmitted set of weighted project units and the proposed change.

* * * * *